United States Patent
Choo et al.

(10) Patent No.: US 8,054,846 B2
(45) Date of Patent: *Nov. 8, 2011

(54) METHOD OF OPERATING INTERNET PROTOCOL ADDRESS AND SUBNET SYSTEM USING THE SAME

(75) Inventors: Ho-Cheol Choo, Seoul (KR); Seok Joon Jang, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/716,575

(22) Filed: Mar. 3, 2010

(65) Prior Publication Data

US 2010/0158029 A1 Jun. 24, 2010

Related U.S. Application Data

(63) Continuation of application No. 11/441,981, filed on May 26, 2006, now Pat. No. 7,693,163.

(30) Foreign Application Priority Data

May 30, 2005 (KR) .................. 10-2005-0045625

(51) Int. Cl.
*H04L 12/56* (2006.01)
*H04L 12/28* (2006.01)
*G06F 15/173* (2006.01)
*G06F 15/16* (2006.01)

(52) U.S. Cl. ........ 370/401; 370/255; 370/389; 370/392; 370/393; 370/408; 709/220; 709/222; 709/224; 709/250

(58) Field of Classification Search .......... 370/252–503; 709/220–224
See application file for complete search history.

(56) References Cited

U.S. PATENT DOCUMENTS

| | | | |
|---|---|---|---|
| 5,751,971 A | 5/1998 | Dobbins et al. | |
| 6,249,820 B1 | 6/2001 | Dobbins et al. | |
| 6,532,217 B1 | 3/2003 | Alkhatib et al. | |
| 6,578,087 B1 * | 6/2003 | Garakani et al. | 709/242 |
| 6,741,585 B1 | 5/2004 | Munoz et al. | |
| 6,754,181 B1 | 6/2004 | Elliott et al. | |
| 7,039,018 B2 * | 5/2006 | Singh et al. | 370/255 |
| 7,095,738 B1 * | 8/2006 | Desanti | 370/389 |

(Continued)

OTHER PUBLICATIONS

Office Action issued Jun. 17, 2009 in co-pending U.S. Appl. No. 11/441,981.

(Continued)

*Primary Examiner* — Ayaz Sheikh
*Assistant Examiner* — Venkatesh Haliyur
(74) *Attorney, Agent, or Firm* — H.C. Park & Associates, PLC

(57) ABSTRACT

A method of operating an Internet protocol (IP) address allocates, creates, and processes an interface identifier (ID) of an IP address area. In the allocation, the IP address area includes a subnet prefix area and an Interface ID area, and certain bits of the Interface ID area are used as an index area of a subnet gateway. The allocation is implemented in order from the higher layer to the lower layer so that the Interface ID area is sequentially allocated from the higher bits for the index areas of the respective layers. The combination of the certain bits of the allocated Interface ID and the subnet prefix area of the IP address area is used as the subnet ID of the subnet layers. The lowest subnet gateway allocates the Interface ID to terminating equipment to access the IP network based on a format of the IP address.

4 Claims, 3 Drawing Sheets

U.S. PATENT DOCUMENTS

| | | | |
|---|---|---|---|
| 7,139,269 B2* | 11/2006 | Kalkunte et al. | 370/389 |
| 7,149,225 B2* | 12/2006 | Thubert et al. | 370/401 |
| 7,165,722 B2* | 1/2007 | Shafer et al. | 235/385 |
| 7,177,295 B1* | 2/2007 | Sholander et al. | 370/338 |
| 7,216,166 B2* | 5/2007 | Sugauchi et al. | 709/224 |
| 7,272,656 B2* | 9/2007 | Miyoshi | 709/230 |
| 7,315,903 B1* | 1/2008 | Bowden | 709/250 |
| 7,388,869 B2* | 6/2008 | Butehorn et al. | 370/401 |
| 7,499,450 B2* | 3/2009 | Foglar et al. | 370/392 |
| 7,693,163 B2* | 4/2010 | Choo et al. | 370/401 |
| 7,729,312 B2* | 6/2010 | Suzuki et al. | 370/331 |
| 7,746,873 B2* | 6/2010 | Saito et al. | 370/400 |
| 2002/0172207 A1* | 11/2002 | Saito et al. | 370/400 |
| 2003/0026241 A1* | 2/2003 | Ono et al. | 370/349 |
| 2003/0074570 A1* | 4/2003 | Miyoshi | 713/190 |
| 2003/0112808 A1 | 6/2003 | Solomon | |
| 2005/0047348 A1* | 3/2005 | Suzuki et al. | 370/252 |
| 2005/0074015 A1 | 4/2005 | Chari et al. | |
| 2005/0089027 A1* | 4/2005 | Colton | 370/380 |
| 2005/0174998 A1* | 8/2005 | Vesterinen et al. | 370/354 |
| 2005/0199716 A1* | 9/2005 | Shafer et al. | 235/385 |
| 2005/0243818 A1 | 11/2005 | Foglar et al. | |

OTHER PUBLICATIONS

Office Action issued Dec. 19, 2008 in co-pending U.S. Appl. No. 11/441,981.

Notice of Allowance issued Nov. 17, 2009.

* cited by examiner

METHOD OF OPERATING INTERNET PROTOCOL ADDRESS AND SUBNET SYSTEM USING THE SAME

CROSS-REFERENCE TO RELATED APPLICATIONS

The present application is a continuation of U.S. patent application Ser. No. 11/441,981, filed on May 26, 2006, which claims priority from and the benefit of Korean Patent Application No. 10-2005-0045625, filed on May 30, 2005, the content of both are incorporated by reference for all purposes as if fully set forth herein.

BACKGROUND OF THE INVENTION

1. Field of Invention

The present invention relates to an Internet protocol (IP) address operation, and more particularly to a method of operating an IP address that allocates, creates, and processes an interface identifier (ID) in an IP address area, and a subnet system using the same.

2. Description of the Prior Art

Generally, Internet is serviced based on an IPv4 address. Since the IPv4 uses 32 bits address space, logically, it can provide 42 hundred million address spaces. However, the allocation of IPv4 address is done in class unit so that the number of actually usable addresses is smaller than the logical one, which may result in a serious lack of the number of the available addresses when used in home network, ALL-IP, and other networks and devices in the future.

To solve the above problem, an IPv6 address system has been proposed. The IPv6 address uses 128 bits address space, in which the higher order 64 bits are comprised of subnet prefix information, and the lower order 64 bits of an interface identifier (ID).

FIG. 1 illustrates a general IPv6 aggregable global unicast address format. In FIG. 1, higher order 64 bits information is allocated as subnet prefix information in accordance with Internet communication network management rule, and lower order 64 bits information is automatically created as an Interface ID by the use of identifier information provided in a network device.

In FIG. 1, the higher order 64 bits space is divided into multi areas for hierarchical allocation. The 64 bits rows as hierarchically allocated express a subnet prefix and form a complete global unicast address in combination with the Interface ID of the lower 64 bits area.

As illustrated in FIG. 1, the subnet prefix includes 3 bits Format Prefix (FP), 13 bits top level aggregation (TLA) ID, 8 bits REServed for future use (RES), 24 bits Next Level Aggregation (NLA) ID, and 16 bits Site Level Aggregation (SLA) ID. If a value of FP is '001', for example, it indicates one for aggregable global unicast address.

The Interface ID follows an EUI-64 format by the recommendation of the Internet Engineering Task Force, and the Interface ID created following such format is ensured to be a unique Interface ID for a device in a global area or a local area.

As illustrated in FIG. 2, an Interface ID with a format of EUI-64 is comprised of 24 bits Company ID and 40 bits Extension ID, and 128 bits address in combination of the corresponding Interface ID and subnet prefix interface information in the higher order 64 bits is a unique one as a global unicast address.

As described above, since the conventional IPv6 address system is comprised of 64 bits as subnet prefix information and 64 bits as Interface ID, the maximum number of the IPv6 addresses allocatable to a subnet and the number of the device having simultaneous access thereto can be $2^{64}$, respectively. In this case, a gateway managing one subnet should have $2^{64}$ routing information, which is a great amount of information. Accordingly, a large amount of memory was required for simultaneous routing, and this caused a delay during matching of routing information.

SUMMARY OF THE INVENTION

Accordingly, the present disclosure describes a method of operating an IP address that allocates, creates, and processes an interface identifier (ID) in an IP address area, and a subnet system using the same.

The present disclosure also describes a subnet gateway hierarchically for an interface identifier (ID) of an IPv6 address area to distribute a load to perform an effective routing.

The present disclosure also describes extending subnet prefix information even to an Interface ID in an IPv6 address area to reduce the amount of routing information of an Internet adapter upon the adaptation to a wireless a wireless network.

The present disclosure also describes operation of a mobile communication terminal as an IPv6 network access point to the peripheral devices thereof to adapt it to a home networking or other various services.

The present disclosure also describes using a subnet prefix in an IPv6 address area as a subnet ID to transfer, to a lower layer gateway, routing information of a gateway managing the corresponding subnet, thereby reducing the excessive use of memory and the generation of excessive load during routing information matching.

The present disclosure also describes preventing the dissipation of IP address possibly occurring in an existing EUI-64 format, thereby performing management of IP address.

The exemplary embodiments of the present disclosure disclose a method of operating an Internet protocol (IP) address, the method comprising the steps of: in an IP area including a subnet prefix area and an Interface ID area, allocating certain bits of the Interface ID area as an index area of a subnet gateway; allocating the combination of the certain bits and the subnet prefix area as the subnet ID area; and allocating an Interface ID for terminating equipment having access to an IP network based on a format of the IP address in a lowest subnet gateway.

The exemplary embodiments of the present disclosure disclose a subnet system comprising: a first gateway; and at least one lower layered gateway constituting at least one lower layer to the first gateway, wherein the respective IP address of the lower layered gateway constituting the lower layer to the first gateway uses certain bits of an Interface ID area of the IP address of the of the IP address of the first gateway as each index area.

According to exemplary embodiments, the higher order 64 bits subnet prefix value in the IPv6 address area is allocated as a unique one in a global area. That is, the exemplary embodiments of the present invention may provide the provision of a single Interface ID on the same link using the same sub prefix. Accordingly, a single global unicast address may be used without following a conventional EUI-64 format. In addition, in this context, the subnet gateway serves to create and allocate Interface IDS, and to manage the respective Interface IDS to be the single ones without being overlapped on the link, thereby managing address and routing information effectively.

To this end, the exemplary embodiments of the present invention use, as the index area of the subnet gateway, the certain bits of the lower 64 bits Interface ID in the IPv6 address area. In addition, the exemplary embodiments of the present invention use, as a subnet ID, the combination of higher 64 bits subnet prefix and certain part of the corresponding Interface ID, thereby performing a routing using the certain part of the corresponding Interface ID. At this time, the index area of the corresponding subnet gateway is separately allocated to each subnet layer so that the lowest gateway creates an Interface ID to be allocated to terminating equipment.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE ILLUSTRATED EMBODIMENTS

Hereinafter, exemplary embodiments of the present invention will be described with reference to the accompanying drawings.

Figure 1:
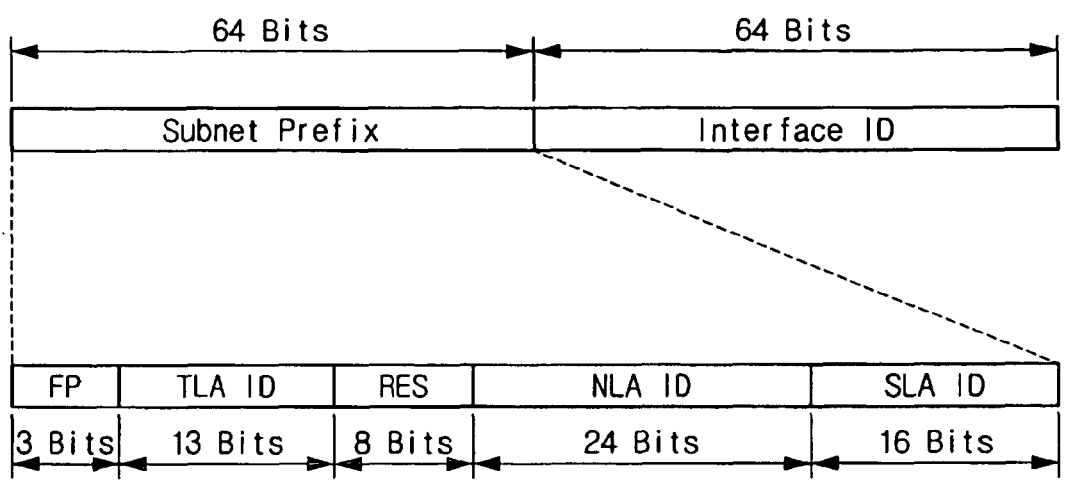
FIG. 1 illustrates a construction of a general IPv6 address.
Figure 2:
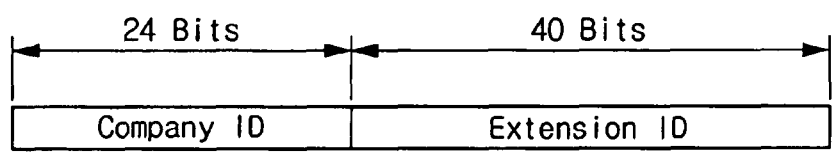
FIG. 2 illustrates a construction of an interface identifier (ID) in the IPv6 address of FIG. 1.
Figure 3:
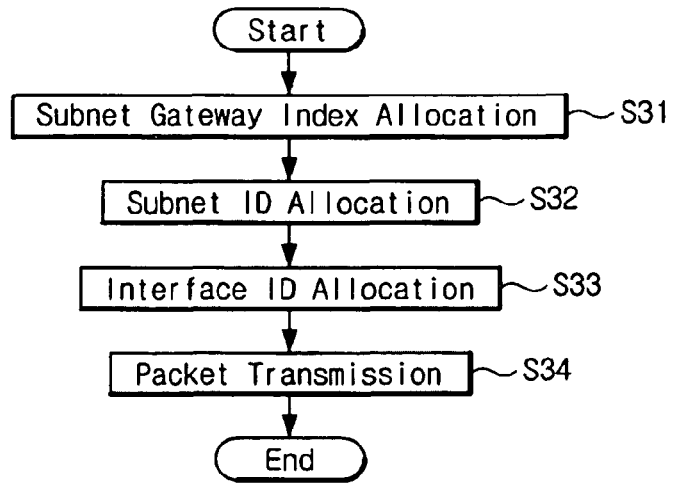
FIG. 3 is a flow chart illustrating a method of operating an Internet protocol (IP) according to an embodiment of the present invention.

A method of operating an Internet protocol (IP) address according to an embodiment of the present invention will be described with reference to a flow chart of FIG. 3.

First, the step is performed to allocate a certain part of the lower 64 bits area (i.e., an Interface ID area) of an IPv6 address area, for a subnet gateway index (S31). Herein, subnet prefix information can extend up to the Interface ID area, as well as the higher 64 bits area (i.e., subnet prefix) of the IPv6 address area.

That is, the certain part of the Interface ID area is hierarchically re-allocated to use even up to certain bits (e.g., 'n' (Bit)) of the lower 64 bits as the subnet prefix area.

Figure 4:
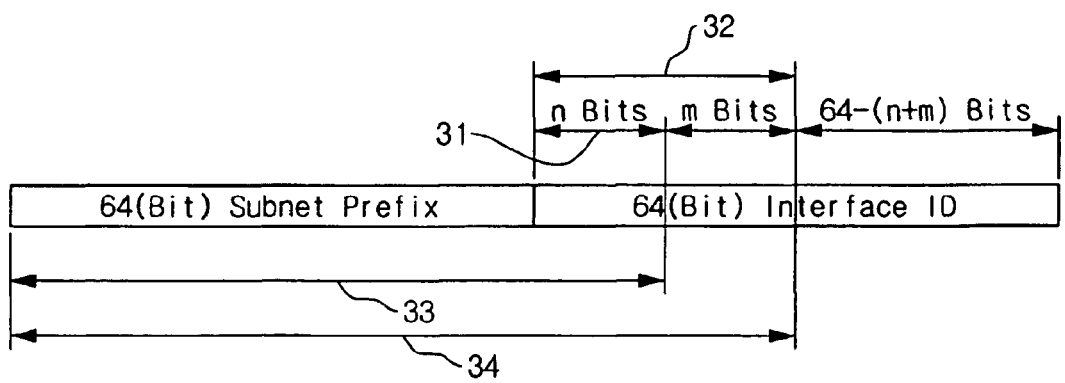
FIG. 4 illustrates a construction of the IP address according to the embodiment of FIG. 3.
Figure 5:
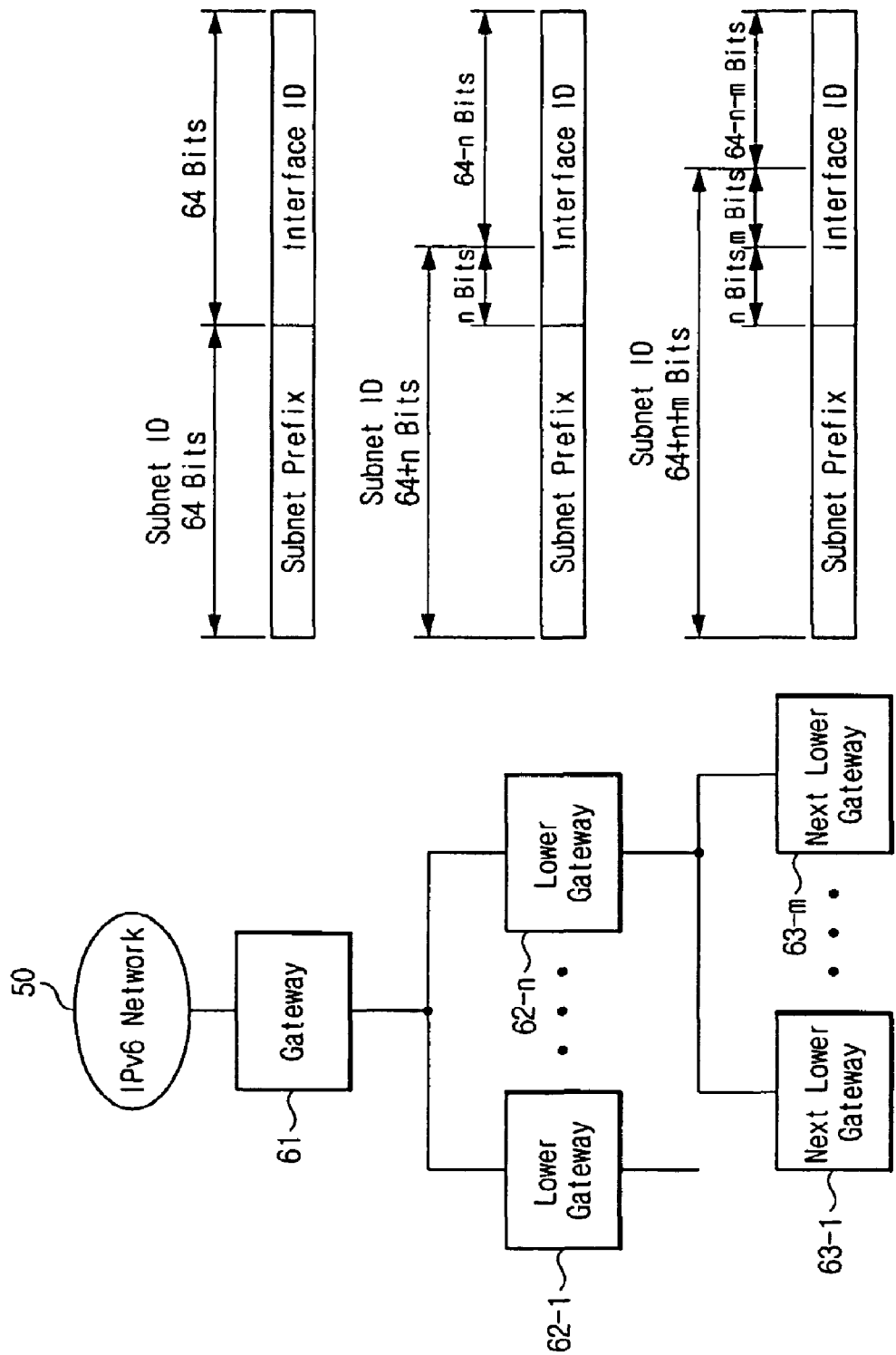
FIG. 5 illustrates a structure of a hierarchical subnet gateway and a construction of the IP address corresponding to the respective layers according to the embodiment of FIG. 3.

Furthermore, up to certain bits (e.g., 'm'(Bit)) of the lower 64-n bits is used as the subnet prefix area, so that an IP address can be used more efficiently. Description is followed on the index allocation S31 of the subnet gateway, referring to an IPv6 address format as illustrated in FIGS. 4 and 5.

First, the step is performed at the subnet gateway to allocate the certain higher bits (e.g., 'n' (Bit)) of the Interface ID area in the IPv6 address area as an index area 31 of the lower subnet gateway.

Then, the step is performed at the lower subnet gateway to allocate the certain bits (e.g., m(Bit)) after the 'n'(Bit) of the Interface ID area in the IPv6 address area as an index area 32 of the next-lower subnet gateway.

After the index allocation S31, the step is performed at the subnet gateway to allocate the combination of the higher 64 bits area (i.e., subnet prefix area) in the IPv6 address area and the certain part of the Interface ID to use as a subnet ID (S32). That is, the index of the subnet gateway allocated on the n(Bit) or n+m(Bit) area of the Interface ID area is combined with subnet prefix information of the higher 64 bits so that the combination is used as the subnet ID (the lower subnet ID 33 and the next lower subnet ID 34 in FIG. 4).

After the subnet ID allocation S32, the step is performed at the lowest subnet gateway to allocate an Interface ID to terminating equipment trying to have access to an IPv6 network based on the format of the IPv6 address formed as described above (S33). At this time, the Interface ID allocation S33 is proceeded as follows.

First, the lowest subnet gateway selects the portion of the Interface ID area that is not included in the subnet ID area to have a value (referred to hereinafter as a termination identifier) that is not overlapped with a value allocated to other terminating equipment.

Then, the lowest subnet gateway extracts the value of the Interface ID area in the area used as subnet ID, combines the extracted value with the termination identifier to create a 64 bits Interface ID, and allocates it to the termination equipment.

Like this, with the formation of a hierarchical subnet gateway using the combination of the certain bits of the Interface ID and subnet prefix information as the subnet ID, the corresponding hierarchical subnet gateway processes input packets to transmit to a destination, using the IPv6 address having access to the IPv6 network and formed as described above (S34).

At this time, the hierarchical subnet gateway, as illustrated in FIG. 5, may include an IPv6 network 50, a gateway 61 having access to the corresponding IPv6 network 50, a plurality of lower gateways 62-1 to 62-n connected to the corresponding gateway 61, and a plurality of next lower gateways 63-1 to 63-m connected to the respective lower gateways 62-1 to 62-n. In addition, there may further be a plurality of gateways connected to the respective next lower gateways 63-1 to 63-m.

In FIG. 5, it is configured such that the gateway 61 uses the higher 64 bits subnet prefix as a subnet ID, the respective lower gateways 62-1 to 62-n use the combination of the higher 64 bits subnet prefix and the certain bits (i.e., 'n'(Bit)) of the lower 64 bits Interface ID as a subnet ID, and the next lower gateways 63-1 to 63-m use the combination of the higher 64 bits subnet prefix and the certain bits (i.e., 'n+m' (Bit)) of the lower 64 bits Interface ID as a subnet ID.

Meanwhile, an operation of the packet transmission S34 will now be explained with reference to a hierarchical subnet gateway structure as illustrated in FIG. 5.

First, upon external input of packets, the subnet gateway 61 checks whether they are to be transmitted to its subnet. As a result, if the packets are to be transmitted to its subnet, the step is performed to mask certain higher bits (i.e., 'n'(Bit)) of the Interface ID and to transmit the masked packets to the corresponding lower subnet gateways 62-1 to 62-n matched thereto.

When receiving the packets from the higher subnet gateway 61, the lower subnet gateways 62-1 to 62-n check whether the packets are to be transmitted to their subnet. Herein, if there is the more-refined next lowered subnet, the step is performed to mask the certain bits (e.g., 'm' (Bit)) after the certain higher bits (i.e., 'n'(Bit)) of the Interface ID and to forward the masked packets to the next lowered subnet gateways 63-1 to 63-m matched thereto, thereby transmitting the corresponding packets to the destination.

As described before, a method of operating an IP address according to an embodiment of the present invention performs the routing process hierarchically such that the management of vast amounts of routing information, which had been performed in a single subnet gate in the prior art, is transferred to the lower layered router, thereby managing the routing table more efficiently.

In addition, a method of operating an IP address according to an embodiment of the present invention allocates the Interface ID of the IPv6 address area to use, thereby constituting the subnet gateway hierarchically and performing the load distribution and routing.

In addition, with the adaptation of a method of operating an IP address according to an embodiment of the present invention to a wireless environment such as, for example, 3GPP/3GPP2 or others, the amounts of information of an Internet adapter are to be reduced so that it may be easier to manage routing information and sessions in GGSN/PDSN. In addition, even in the case where a terminal is used as an IPv6 network access point for the peripheral devices thereof based on IPv6, the home networking services can be performed by using a method of operating an IP address according to an exemplary embodiment of the present invention.

As set forth before, a method of operating an IP address according to an exemplary embodiment of the present invention constitutes a subnet gateway hierarchically, and uses a subnet prefix in an IPv6 address area as a subnet ID to transfer the amounts of routing information of the corresponding subnet gateway to the lower gateway, thereby distributing an excessive load due to the process of the received packets and performing IP address management and routing.

Although illustrated embodiments of the present invention have been described for illustrative purposes, those skilled in the art will appreciate that various modifications, additions and substitutions are possible, without departing from the scope and spirit of the invention as disclosed in the accompanying claims and their equivalents.

What is claimed is:

1. A method for operating an Internet protocol (IP) address, comprising:
    (a) in an IP address comprising a subnet prefix area and an Interface ID area, allocating certain bits of the Interface ID area as an index area of a lowest subnet gateway, wherein the subnet prefix area comprises 64 bits;
    (b) allocating a first portion and a second portion of the certain bits for choosing a lower subnet gateway and next lower subnet gateway hierarchically;
    (c) recreating an Interface ID using the certain bits, and allocating the Interface ID to terminating equipment having access to an IP network based on a format of the IP address in the lowest subnet gateway;
    (d) at a first subnet gateway, allocating the first portion of the certain bits as an index area of the lower subnet gateway; and
    (e) at the lower subnet gateway, allocating the first portion and the second portion of the certain bits as an index area of the next lower subnet gateway
    wherein the step (c) comprises:
    selecting, from a portion of the interface ID area that is not included in the certain bits, a value that is not identical to a value allocated to other terminating equipment as a termination identifier;
    extracting the certain bits from the subnet ID area; and
    allocating a combination comprising the certain bits and the termination identifier as the Interface ID for the terminating equipment.

2. The method as claimed in claim 1, further comprising:
    at the subnet gateway, processing input packets using the IP address and transmitting them to a destination.

3. The method as claimed in claim 1, wherein the next lower subnet gateway is the lowest subnet gateway.

4. A method of operating an Internet protocol (IP) address, the method comprising:
    in an IP area comprising a subnet prefix area and an Interface ID area, allocating certain bits of the Interface ID area as an index area of a subnet gateway, wherein the subnet prefix area comprises 64 bits;
    allocating a first portion and a second portion of the certain bits for choosing a lower subnet gateway and next lower subnet gateway hierarchically; and allocating an Interface ID for terminating equipment having access to an IP network based on a format of the IP address in a lowest subnet gateway; and at the subnet gateway, processing input packets using the IP address and transmitting them to a destination, wherein the packet transmission step comprises:
    at the subnet gateway, checking whether external input packets are to be transmitted to the subnet gateway's subnet; if the packets are to be transmitted to the subnet gateway's subnet, masking first higher bits of the Interface ID and transmitting the masked packets to the corresponding lower subnet gateway matched thereto;
    at the lower subnet gateway, checking whether the packets inputted from the higher subnet gateway are to be transmitted to the lower subnet gateway's subnet; and if the packets are to be transmitted to the lower subnet gateway's subnet, masking second higher bits following the first higher bits and forwarding the masked packets to the next lower subnet gateway matched thereto to transmit them to the corresponding destination.

* * * * *